Figure 1:
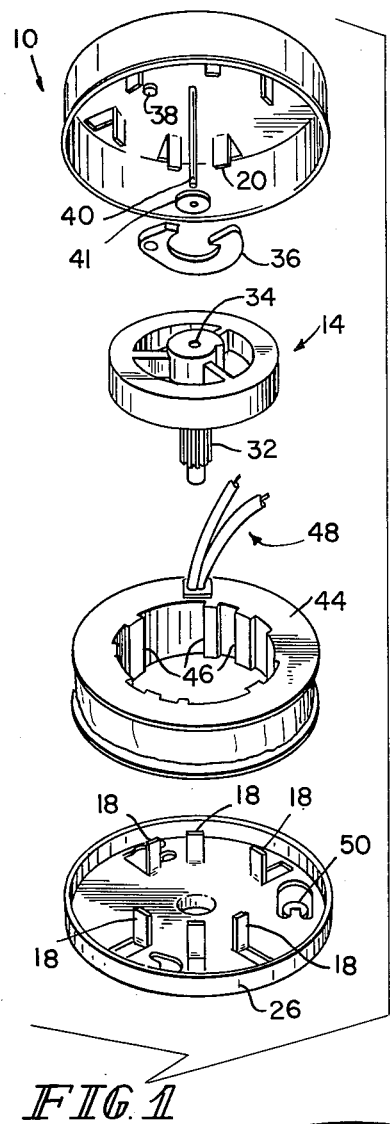

United States Patent [19]

Blanchard et al.

[11] 4,056,744

[45] Nov. 1, 1977

[54] NOISE DAMPENING MEANS FOR A PERMANENT MAGNET SYNCHRONOUS MOTOR

[75] Inventors: James S. Blanchard; Charles E. Kapper, both of Indianapolis, Ind.

[73] Assignee: P. R. Mallory & Co. Inc., Indianapolis, Ind.

[21] Appl. No.: 602,661

[22] Filed: Aug. 7, 1975

Related U.S. Application Data

[63] Continuation of Ser. No. 479,800, June 17, 1974, abandoned.

[51] Int. Cl.² .............................................. H02K 5/24
[52] U.S. Cl. ..................................... 310/51; 310/162; 310/156; 29/598

[58] Field of Search .................. 310/40, 40 MM, 156, 310/162, 163, 164, 49, 90, 41, 51, 191, 209; 74/574; 64/1 V; 29/598

[56] References Cited

U.S. PATENT DOCUMENTS

| 2,823,327 | 2/1958 | Kohlhagen | 310/164 |
| 3,307,056 | 2/1967 | Woolley | 310/41 |
| 3,333,129 | 7/1967 | Kohlhagen | 310/164 |
| 3,719,842 | 3/1973 | Kuntz | 310/164 |
| 3,894,252 | 7/1975 | Miwa | 310/51 |
| 3,906,264 | 9/1975 | Kuwako | 310/51 |

*Primary Examiner*—R. Skudy
*Attorney, Agent, or Firm*—Hoffmann, Meyer & Coles

[57] ABSTRACT

Noise caused by axial rotor oscillation is reduced by reducing the rotor's oscillations. Such reduction of oscillation is provided by making one set of stator poles shorter than the other or by providing a magnetic attraction between the rotor and the motor housing.

5 Claims, 5 Drawing Figures

U.S. Patent   Nov. 1, 1977   4,056,744

NOISE DAMPENING MEANS FOR A PERMANENT MAGNET SYNCHRONOUS MOTOR

This is a continuation, of application Ser. No. 479,800, filed 6/17/74, now abandoned.

Generally speaking, the present invention relates to permanent magnet synchronous motors and more particularly to an improved method of reducing noise in a permanent magnet synchronous motor, which comprises providing an axial imbalance of magnetic flux around a rotor urging it in a direction substantially parallel to the rotational axis of the rotor against a face of the motor housing.

There are a multitude of application for small synchronous motors of the type having a permanent magnet rotor. Many of these applications are in timing devices such as clocks and appliances such as clothes washers and dryers which utilize timed sequence switches. One problem associated with these types of synchronous motors is noise. Objectionable levels of noise are difficult to prevent, especially in appliances where motors have been attached in such a manner that the housing of the appliance amplifies the sound produced by the motors. Because the noise is caused by a number of sources, each source must be considered in reducing the noise. One of the more significant sources of noise is caused by axial oscillation of the rotor along its shaft as it rotates resulting in a persistent banging of the rotor against the housing.

The present invention provides a solution to this noise problem by magnetically dampening the axial oscillations of the rotor.

It is, therefore, a feature of the present invention to provide a noise dampening means for a permanent magnet synchronous motor. Another feature of the present invention is to provide a method of magnetically dampening noise in a permanent magnet synchronous motor. Another feature of the present invention is to provide an improvement to a permanent magnet synchronous motor that provides an axial imbalance of magnetic flux around a rotor to urge it in a direction generally parallel to its rotational axis for the purpose of reducing noise. Another feature of the present invention is to provide an improved means and method of reducing noise in a permanent magnet synchronous motor wherein the lengths of one set of stator poles are shorter than the other set of stator poles. Another feature of the present invention is to provide an improved method of reducing noise in a permanent magnet synchronous motor wherein a magnetic material carried by a rotor is attracted to a magnetically-attractable material carried by the housing of the motor.

Figure 2:
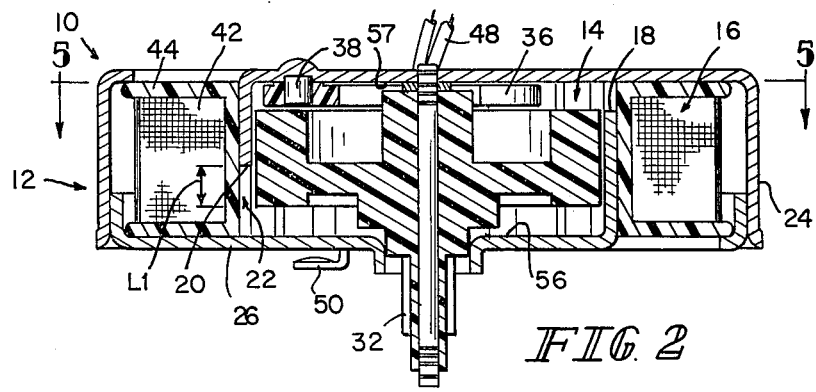
Figure 3:
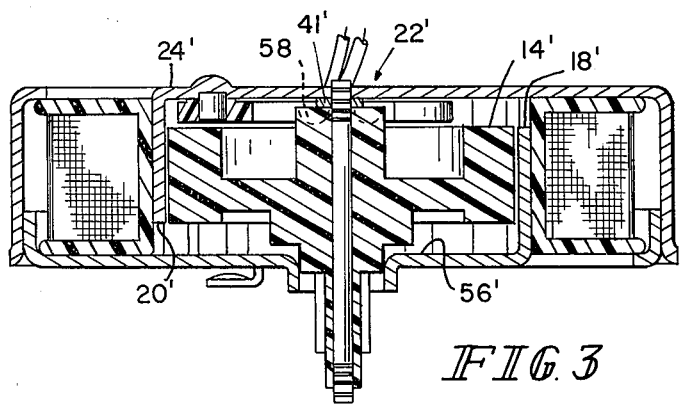
Figure 4:
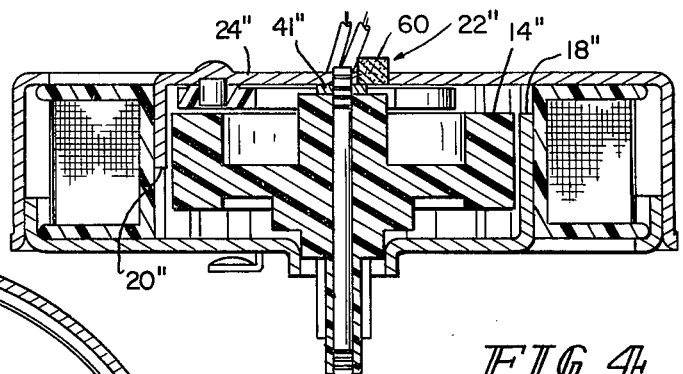
Figure 5:
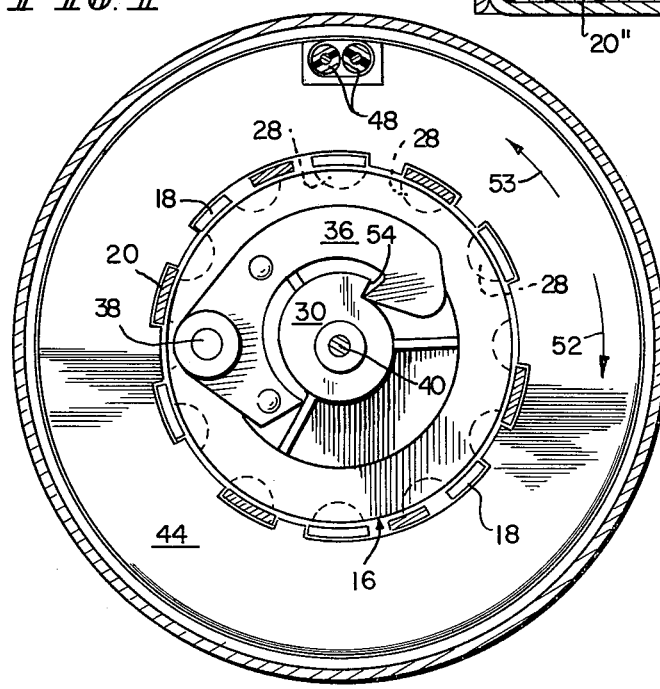

These and other features will become more apparent from the following description taken in conjunction with the accompanying drawings wherein:

FIG. 1 is an exploded view of the motor;
FIG. 2 is a section of one embodiment of the motor taken in elevation;
FIG. 3 is a section of another embodiment of the motor taken in elevation;
FIG. 4 is a section of a third embodiment of the invention taken in elevation; and
FIG. 5 is a view taken along line 5—5 of FIG. 2.

Referring now to the drawings, the component parts of the present invention may be visualized. A permanent magnet synchronous motor 10 includes a housing 12, a permanent magnet rotor 14, a stator winding 16, a first set of stator poles 18, a second set of stator poles 20, and a magnetic dampening means 22 for dampening noise in the motor.

Housing 12 comprises a stator cup 24 and a field plate 26 held together to form the substantially cylindrical structure of housing 12. The material for stator cup 24 and field plate 26 may be ordinary cold-rolled steel, preferably annealed, but may be of other magnetically attractable materials. The first set of stator poles 18 is formed by lancing radial strips out of the flat portion of field plate 26 and forming them parallel to the rotational axis of the motor. In the same manner, the second set of stator poles 20 are lanced from stator cup 24. The assembled combination of field plate 26 and stator cup 24 provides both sets of stator poles 18 and 20 interleaved in a circular pattern. The stator pole arrangement is asymmetrical and provides alternate flux at individual poles in a typical permanent magnet synchronous motor manner well known in the art.

Permanent magnet rotor 14 is comprised of a permanent magnet material, such as barium ferrite and includes rotor poles 28, a directional cam 30, a pinion 32 and an aperture 34. Rotor poles 28 are separately magnetized pole segments of alternate north and south polarity arranged around the periphery of rotor 14 in a manner well known and widely used in the permanent magnet synchronous motor field. One common method of impressing poles in a rotor is to expose the rotor for a short period of time to very powerful magnetic fields located in a predetermined configuration to produce the correct number and spacing of poles on the rotor. Directional cam 30 cooperates with a directional pawl 36 which is pivotally carried on a post 38 protruding from stator cup 24 to insure one-way running of rotor 14. Pinion 32 provides a convenient means for extracting rotary motion from motor 10. And, aperture 34 provides a rotational bearing surface through which a rotor shaft 40 extends. Rotor shaft 40 is fixedly carried by stator cup 24. A thrust bearing 41 is carried on shaft 40 between stator cup 24 and rotor 14.

Stator winding 16 includes a coil of wire 42 wound on a bobbin 44. The bobbin includes a plurality of splines 46 to help position stator poles 18 and 20 in a predetermined position. Lead wires 48 carry electric current to the coil of wire 42.

There is also provided in the present motor locking tabs 50 lanced from field plate 26 which are used to lock motor 10 to a housing of a speed reduction means (not shown) such as a gear box.

In the illustrated embodiment, the arrangement of stator poles 18 and 20 and the type of rotor used provides good starting characteristics and high running torque. One example of the arrangement of stator poles 18 and 20 and the corresponding pattern of rotor poles 28 on rotor 14 is described in detail in U.S. Pat. No. 3,719,842, "Synchronous Motor", issued Mar. 6, 1973 to Kenneth C. Kuntz.

In operation, when an alternating current is applied to stator winding 16, rotor 14 will begin to rotate due to the magnetic flux paths generated between rotor poles 28 and poles 18 and 20. The starting of rotor 14 is initiated by the asymmetrical arrangement of stator poles 18 and 20. In the event the rotor starts to run in a wrong-way direction, (indicated by an arrow 52 in FIG. 5) directional pawl 36 engages a stop 54 on directional cam 30 and causes rotor 14 to rebound and start in the correct direction indicated by arrow 53. A mirror image of the directional cam and pawl illustrated in FIG. 5 will result the motor running the opposite direction.

During the running of the motor as described herein, rotor 14 often tends to oscillate in an axial direction along shaft 40. If the motor is positioned in a manner that the oscillating rotor can bang against a face 56 of field plate 26, an annoying noise can result. A magnetic dampening means, which dampens this noise, is shown as three embodiments 22, 22' and 22" in FIGS. 2, 3, and 4, respectively.

In FIG. 2, magnetic dampening means 22 comprises a length difference L1 between stator poles 18 and 20. Poles 20 extending from stator cup 24 are shorter in length, taken in a direction parallel to the rotational axis of rotor 14, than are poles 18 extending from field plate 26. This results in an imbalance of magnetic flux around rotor 14 that ultimately urges the rotor away from face 56 and toward another face 57, thereby dampening the rotor's noise-producing oscillations.

Another embodiment of a magnetic dampening means 22' is shown in FIG. 3. Unlike the motor of FIG. 2, the stator poles 18' and 20' of the motor of FIG. 3 are substantially equal in length. Magnetic dampening means here comprises a separate magnet 58 impressed in rotor 14' near bearing 41'. Magnet 58 may be impressed in the same manner described previously for impressing rotor poles in a rotor. Magnet 58 attracts the iron-containing material of stator cup 24' and draws rotor 14' away from face 56' and against bearing 41', thereby dampening oscillations of the rotor.

A third embodiment of a magnetic dampening means 22" is shown in FIG. 4. In this case an external magnet 60 is carried by stator cup 24" in a position so as to attract the magnetically-attractable material of rotor 14" toward bearing 41". And, in this embodiment, too, the oscillations of rotor 14" are dampened.

What is claimed is:

1. In a permanent magnet synchronous motor that includes a housing comprising a field plate secured to a stator cup, a permanent magnet rotor journaled for rotation in said housing, a stator winding carried by said housing, a first set of stator poles extending from a face of said field plate and disposed in an annular configuration around a periphery of said permanent magnet rotor, the improvement which comprises a second set of stator poles projecting from a face of said stator cup in an annular configuration and interleaved with said first set of stator poles around said periphery of said permanent magnet rotor, wherein said second set of stator poles are shorter in a direction taken substantially parallel to the rotational axis of said permanent magnet rotor than said first set of stator poles, whereby, upon energizing of said stator winding, an axially imbalanced magnetic field in created in said first and second sets of stator poles around said permanent magnet rotor, thereby urging said permanent magnet rotor axially against a face of said stator cup to dampen noise caused by axial oscillations of said permanent magnet rotor against said face of said stator cup.

2. An improvement to a permanent magnet synchronous motor as recited in claim 1 further including a thrust bearing disposed on said face of said stator cup against which said permanent magnet rotor is urged.

3. A method of reducing noise in a permanent magnet synchronous motor of the type that includes a housing, a permanent magnet rotor having rotor poles disposed thereon and journalled for rotation in said housing, a stator winding carried by said housing, and first and second sets of stator poles carried by said housing, comprising the steps of: interleaving said first and second sets of stator poles, and reducing the length of each pole in one of said first and second sets of stator poles in relation to the length of the poles in another set, said lengths taken in a direction substantially parallel to said rotational axis of said permanent magnet rotor whereby an axial unbalance of magnetic flux about said rotor is created so as to urge said permanent magnet rotor in a direction substantially parallel to the rotational axis of said permanent magnet rotor away from a first face of said housing and toward a second face, whereby axial oscillation of said rotor is reduced to reduce noise caused by rotor oscillation.

4. A method of reducing noise in a permanent magnet synchronous motor of the type that includes a housing, a permanent magnet rotor having rotor poles disposed thereon and journalled for rotation in said housing, a stator winding carried by said housing, and first and second sets of stator poles carried by said housing, comprising the steps of: interleaving said first and second sets of stator poles, and providing a magnet carried by said rotor and a magnetically-attractable iron-containing material carried by said housing so as to be magnetically attracted to said housing and to urge said permanent magnet rotor in a direction substantially parallel to the rotational axis of said permanent magnet rotor away from a first face of said housing and toward a second face, whereby axial oscillation of said rotor is reduced to reduce noise caused by said rotor oscillation.

5. A method of reducing noise in a permanent magnet synchronous motor of the type that includes a housing, a permanent magnet rotor having rotor poles disposed thereon and journalled for rotation in said housing, a stator winding carried by said housing, and first and second sets of stator poles carried by said housing, comprising the steps of: interleaving said first and second sets of stator poles, and providing an external magnet carried by said housing and a permanent magnet material carried by said permanent magnet rotor so as to be magnetically attracted to said housing and to urge said permanent magnet rotor in a direction substantially parallel to the rotational axis of said permanent magnet rotor away from a first face of said housing and toward a second face, whereby axial oscillation of said rotor is reduced to reduce noise caused by rotor oscillation.

* * * * *